Patented Mar. 13, 1951

2,545,174

UNITED STATES PATENT OFFICE 2,545,174

ETHERS OF ARYL SULFONAMIDE-FORMALDEHYDE REACTION PRODUCTS

George Robert Sido, Springfield, Mass., assignor to Monsanto Chemical Company, St. Louis, Mo., a corporation of Delaware No Drawing. Application September 27, 1947, Serial No. 776,627

7 Claims. (Cl. 260—556)

This invention relates to ethers of aryl sulfonamide-formaldehyde reaction products. More particularly, the invention relates to alcohol reaction products of condensation products of aldehydes and aryl sulfonamides.

An object of this invention is to provide new derivatives of aryl sulfonamides.

A further object is to provide alcohol reaction products of aryl sulfonamide-aldehyde reaction products.

Another object is to provide a process for preparing alcohol reaction products of aryl sulfonamide-aldehyde reaction products.

These and other objects are attained by reacting alcohols with aryl sulfonamide-aldehyde reaction products.

The following examples are given in illustration and are not intended to limit the scope of this invention. Where parts are mentioned, they are parts by weight.

Example I 500 parts of p-toluene sulfonamide were mixed with 477 parts of formalin (37% formaldehyde) and the pH of the mixture was adjusted to about 9 with aqueous sodium hydroxide. The mixture was heated at 30–35° C. with constant agitation for about 1 hour to obtain a liquid methylol derivative of p-toluene sulfonamide. The reaction mixture separated into two phases, one of which was mainly water. The water phase was removed by decantation.

Example II 1150 parts of methanol and 30 parts of concentrated hydrochloric acid were mixed with 600 parts of the methylol derivative of p-toluene sulfonamide obtained in Example I. The mixture was heated at 25–35° C. with constant agitation for about 4 hours. The reaction mixture was neutralized with 20% aqueous sodium hydroxide to a pH of about 7 and then concentrated under about 27" of vacuum until a temperature of about 95° C. was obtained. 400 parts of methanol were added to the remaining mixture which was then filtered and further concentrated under vacuum to a temperature of about 150° C.

The product was a viscous, almost colorless liquid at room temperature. It was compatible with a wide range of synthetic and natural resins, cellulose derivatives, etc. It acted as a plasticizer for the resins and was particularly valuable as such due to its low volatility and property of increasing the adhesiveness of the plasticized compositions.

Example III 100 parts of a methylol derivative of p-toluene sulfonamide prepared as described in Example I were mixed with 177 parts of 2-ethyl hexanol and 2 parts of methyl phosphoric acid. The mixture was heated until it began to reflux and then vacuum distilled at about 27" of mercury absolute until the temperature rose to about 120° C. The mixture was then neutralized and further distilled under vacuum until a temperature of about 180° C. was attained. The product was cooled to 120° C., filtered and further cooled to room temperature. It was an amber-colored liquid.

Example IV 100 parts of a methylol derivative of a 10:90 mixture of ortho and para toluene sulfonamides prepared by the method described in Example I were mixed with 250 parts of n-butanol and 2 parts of methyl phosphoric acid. The mixture was heated to reflux temperature at atmospheric pressure for about 15 minutes and then vacuum distilled until a portion of water and excess n-butanol were removed. The hot product was neutralized with aqueous alkali, vacuum concentrated until only traces of water remained, filtered and further distilled under vacuum to remove all traces of n-butanol. The product was a clear, colorless liquid.

Example V 100 parts of a methylol derivative of ortho toluene sulfonamide prepared by the process described in Example I were mixed with 150 parts of benzyl alcohol and 2 parts of methyl phosphoric acid. The mixture was heated until it began to reflux and it was then partially concentrated by vacuum distillation, neutralized with aqueous alkali, filtered and finally completely freed from excess benzyl alcohol and traces of water by further vacuum distillation. The product was a clear, slightly yellow viscous liquid.

Example VI 157 parts of benzene sulfonamide were mixed with 165 parts of formalin (37% formaldehyde) and the pH of the mixture was adjusted to about 9 with aqueous alkali. The mixture was heated under constant agitation at about 30° C. for about 30 minutes. The product, a methylol derivative of benzene sulfonamide, was insoluble in water and separated therefrom.

Excess water was decanted and the remainder was dissolved in 150 parts of methanol containing 10 parts of concentrated hydrochloric acid.

The mixture was heated with constant agitation at 25–35° C. for about 4 hours. It was then partially concentrated under vacuum, neutralized with aqueous alkali, filtered and finally freed from water and excess alcohol by vacuum distillation. The product was a clear, colorless liquid.

*Example VII*

650 parts of p-toluene sulfonamide were mixed with 620 parts of formalin (37% formaldehyde) and the pH of the mixture was adjusted to about 9 with aqueous sodium hydroxide. The mixture was maintained at room temperature (about 25° C.) for 1 hour with constant agitation. At the end of the reaction period, the contents of the reaction vessel separated into two phases, one of which was aqueous. The aqueous phase was removed by decantation and 1000 parts of n-butanol were added to the methylol-p-toluene sulfonamide phase. The mixture was warmed at 40° C. until a clear solution was obtained. 35 parts of concentrated hydrochloric acid were added to the clear solution which was then cooled to room temperature and maintained under constant agitation at room temperature for about 3 hours during which a two-phase system developed. The reaction product was then neutralized with aqueous alkali, the aqueous phase was decanted and the alcohol phase was concentrated at a vacuum of about 25" of mercury absolute until the temperature rose to about 130° C. The product was washed with water and then further distilled under vacuum to remove water and excess n-butanol. The product was a clear, colorless liquid which was identified as an n-butyl adduct of a p-toluene sulfonamide-formaldehyde condensation product.

All of the products obtained in the examples were compatible with a wide variety of synthetic and natural resins, cellulose derivatives, etc. They acted as substantially permanent plasticizers for these materials and in the case of coatings such as alkyd resin coatings, increased their adhesion to various materials such as metals, glass, wood, etc.

The starting materials of this invention are the aldehyde reaction products of aryl and substituted aryl sulfonamides which are made by the reaction between aldehydes and aryl sulfonamides under alkaline conditions.

Other aldehydes than formaldehyde may be used including acetaldehyde, butyraldehyde, propionaldehyde, isobutyraldehyde, hexaldehyde, 2-ethyl hexaldehyde, benzaldehyde, crotonaldehyde, cinnamaldehyde, acrolein, methacrolein, furfural, glyoxal, etc. Polymeric aldehydes such as paraformaldehyde, paraldehyde, trioxymethylene, etc., or compounds which release aldehydes under the reaction conditions such as hexamethylene tetramine may be used. A mixture of aldehydes may also be used. The amount of aldehyde to be used may vary from 1 to 2 or more mols per mol of aryl sulfonamide. It is preferred to use an excess of aldehyde to promote a more even and complete reaction. The excess may be recovered from the water removed at the end of the reaction.

The aryl sulfonamides which may be used are benzene sulfonamide, the ring-substituted derivatives of benzene sulfonamide in which the substituent may be organic including alkyl, aryl, aralkyl, etc. groups or inorganic such as halogen, nitro, etc. radicals or aryl polysulfonamides. Among the specific aryl sulfonamides which may be used are benzene sulfonamide, ortho-, para- or meta-toluene sulfonamide, ortho-, para-, or meta-ethyl benzene sulfonamide, diphenyl sulfonamide, phenanthracene sulfonamide, naphthalene sulfonamides, toluene disulfonamides, ortho-, meta-, and para-chloro benzene sulfonamides, nitrobenzene sulfonamides, etc. A mixture of two or more aryl sulfonamides may be used.

The reaction between the aldehyde and the aryl sulfonamide is carried out at a pH of greater than 7 and preferably in the range of 8–10. Aqueous sodium hydroxide or other alkali or alkaline reacting material may be used to adjust the pH. The reaction may be carried out at temperatures ranging from about 0° C. to about 100° C. under constant agitation.

The reaction products are substantially insoluble in water and separate therefrom as formed. The excess aldehyde and water are then removed from the aldehyde-aryl sulfonamide condensation product by simple decantation, filtration or other conventional means. It is not necessary to dehydrate the condensation product completely before reacting further with alcohols.

The reaction of alcohols with the aldehyde-aryl sulfonamide reaction products is carried out in the presence of an acid catalyst such as hydrochloric, ethyl phosphoric, methyl phosphoric, formic, acetic, benzene sulfonic, phosphoric acids, etc., at temperatures which may range from about 0° C. to reflux temperature at atmospheric pressure. The amount of acid catalyst used may be varied from about 0.25 to 25 parts per 100 parts of aryl sulfonamide-aldehyde condensation product with the larger amount being used at the lower reaction temperatures.

Examples of alcohols which may be used to produce the products of this invention are monohydric alcohols such as methanol, ethanol, propanol, isopropanol, n-butanol, isobutanol, t-butanol, pentanols, octanols, 2-ethyl hexanol, cetyl alcohol, stearyl alcohol, benzyl alcohol, cinnamyl alcohol, crotyl alcohol, allyl alcohol, cyclohexanol, etc., polyhydric alcohols, such as glycols, polymethylene glycols, polyalkylene glycols, pentaerythritol, sorbitol, mannitol, etc., substituted alcohols, such as halo alcohols, nitroalcohols, aminoalcohols, etc., ether alcohols such as glycol monoalkyl ethers including among others the glycol mono methyl ether, glycol mono ethyl ether, glycol mono butyl ether, glycol mono octyl ether, glycol mono lauryl ether, etc., ester alcohols such as glycol or glycerol mono esters including glycol mono esters of acetic, butyric, caprylic, lauric, oleic, ricinoleic, phthalic, maleic, fumaric, etc., acids. The amount of alcohol used may vary from 1 to 2 or more mols per mol of aldehyde-aryl sulfonamide reaction product. Since the latter are soluble in the alcohols, it is convenient to use a substantial excess of these components to act as a reaction medium. The excess of alcohol may be removed and recovered by vacuum distillation at the completion of the reaction.

The acid catalyst used in the alcohol reaction should be neutralized on completion of the reaction, with aqueous alkali or other alkaline reacting reagent. It is convenient to add hydrocarbon solvents or diluents such as benzene, toluene, xylene, etc., at the completion of the reaction to facilitate the removal of water. If desired, the neutralization may be deferred until partial concentration of the product has taken place.

The alcohol reaction products of aldehyde-aryl sulfonamide condensation products may be recovered from the alcohol solution by vacuum distillation, drum drying, oven drying or other conventional means.

The products of this invention range from clear, relatively non-volatile liquids to waxy solids, depending on the choice of aldehyde and alcohol. They are soluble in alcohols and substantially insoluble in water.

The exact chemical nature of the products is not precisely known, although it is believed that they are mono ethers of mono N-alkylol derivatives of the aryl sulfonamides. Furthermore, the compounds may not be monomeric in structure as there is some evidence that at least a portion of the material has polymerized to dimers, trimers or possibly higher polymers.

The aryl sulfonamide-aldehyde condensation products will also react with monohydric and polyhydric phenols such as phenol, cresols, xylenols, nitro phenols, halo phenols, resorcinol, catechol, pyrogallol, etc., to yield valuable resinous products which are similar to those made from alcohols and yet differ from the latter in chemical and physical properties.

The products of this invention are particularly valuable as modifiers for natural and synthetic resins, cellulose derivatives, etc. They are compatible with alkyd resins, polyester resins, vinylidene polymers and copolymers, vinyl acetal resins, acrylic and alpha-substituted acrylic derivative polymers and copolymers, cellulose derivatives including cellulose esters, cellulose ethers, etc., phenolic resins, carbamide resins, including urea, thiourea and other substituted urea resins, aminotriazine resins, including melamine and substituted melamine resins, polyamide resins such as nylon, natural resins or their derivatives such as rosin, rosin esters, hydrogenated rosin, copal, kauri, etc., waxes, etc. They act as plasticizers and softeners for these materials and are especially valuable to increase the adhesion of the materials to glass, metal, wood, paper, textile fabrics, etc. Their low volatility makes them important for use as plasticizers for brittle resins since coatings or articles made from the brittle resins plasticized with the new compounds do not become brittle on aging due to plasticizer loss. Moreover, their insolubility in water permits the plasticization of these materials without increasing their water sensitivity.

It is obvious that many variations may be made in the products and processes of this invention without departing from the spirit and scope thereof as defined in the appended claims.

What is claimed is:

1. A water-insoluble product prepared by reacting at from 0° C. to 100° C. and under alkaline conditions from 1 to 2 mols of formaldehyde with 1 mol of an aryl sulfonamide taken from the group consisting of benzene sulfonamide and toluene sulfonamides, and then reacting the product with from 1 to 2 mols of a monohydric unsubstituted alcohol containing from 1 to 8 carbon atoms in the presence of from 0.25 to 25 parts of an acid catalyst per 100 parts of the aryl sulfonamide-formaldehyde condensation product, said latter reaction being carried out at from 0° C. to reflux temperature at atmospheric pressure.

2. A product as in claim 1 wherein the aryl sulfonamide is benzene sulfonamide.

3. A product as in claim 1 wherein the aryl sulfonamide is p-toluene sulfonamide.

4. A product as in claim 3 wherein the aldehyde is formaldehyde.

5. A product as in claim 4 wherein the alcohol is methanol.

6. A product as in claim 4 wherein the alcohol is n-butanol.

7. A product as in claim 4 wherein the alcohol is benzyl alcohol.

GEORGE ROBERT SIDO.

REFERENCES CITED

The following references are of record in the file of this patent:

UNITED STATES PATENTS

| Number | Name | Date |
|---|---|---|
| 2,031,206 | Bren | Feb. 18, 1936 |
| 2,072,971 | Walter | Mar. 9, 1937 |
| 2,160,196 | Bruson et al. | May 30, 1939 |
| 2,184,325 | Sweeney et al. | Dec. 26, 1939 |
| 2,191,943 | Russell et al. | Feb. 27, 1940 |
| 2,243,437 | Orthner et al. | May 27, 1941 |
| 2,312,693 | D'Alelio | Mar. 2, 1943 |
| 2,316,538 | Orthner et al. | Apr. 13, 1943 |
| 2,331,376 | D'Alelio | Oct. 12, 1943 |
| 2,344,321 | Orthner et al. | Mar. 14, 1944 |
| 2,366,494 | D'Alelio | Jan. 2, 1945 |

FOREIGN PATENTS

| Number | Country | Date |
|---|---|---|
| 823,891 | France | Oct. 25, 1937 |
| 858,857 | France | May 20, 1940 |